(12) United States Patent
Hasegawa

(10) Patent No.: US 10,529,962 B2
(45) Date of Patent: Jan. 7, 2020

(54) STORAGE CELL AND POWER STORAGE DEVICE IN WHICH SAME IS USED

(71) Applicant: Panasonic Intellectual Property Management Co., Ltd., Osaka (JP)

(72) Inventor: Takashi Hasegawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/739,145

(22) PCT Filed: Sep. 8, 2016

(86) PCT No.: PCT/JP2016/004096
§ 371 (c)(1),
(2) Date: Dec. 21, 2017

(87) PCT Pub. No.: WO2017/056408
PCT Pub. Date: Apr. 6, 2017

(65) Prior Publication Data
US 2018/0375072 A1    Dec. 27, 2018

(30) Foreign Application Priority Data
Sep. 29, 2015    (JP) .................... 2015-191581

(51) Int. Cl.
*H01M 2/00*    (2006.01)
*H01M 2/10*    (2006.01)
*H01M 10/613*    (2014.01)
(52) U.S. Cl.
CPC ......... *H01M 2/105* (2013.01); *H01M 2/1077* (2013.01); *H01M 10/613* (2015.04)

(58) Field of Classification Search
CPC .... H01M 2/105; H01M 2/1077; H01M 10/10; H01M 10/613; H01M 10/643; H01M 10/6556; H01M 10/6563; H01M 10/425
See application file for complete search history.

(56) References Cited

U.S. PATENT DOCUMENTS

| | | | |
|---|---|---|---|
| 2011/0111269 A1* | 5/2011 | Tse | ................. B60L 3/0007 429/50 |
| 2012/0251855 A1 | 10/2012 | Miyawaki et al. | |
| 2014/0141309 A1 | 5/2014 | Suzuki | |

FOREIGN PATENT DOCUMENTS

| | | |
|---|---|---|
| EP | 2634835 | 9/2013 |
| JP | 2010-153214 | 7/2010 |
| JP | 2012-204296 | 10/2012 |

(Continued)

OTHER PUBLICATIONS

International Search Report of PCT application No. PCT/JP2016/004096 dated Nov. 29, 2016.

*Primary Examiner* — Jane J Rhee
(74) *Attorney, Agent, or Firm* — McDermott Will & Emery LLP

(57) ABSTRACT

A storage cell includes a battery module including a plurality of unit cells; a case for housing the battery module; and a connector installed on a side-wall of the case and electrically connected to the unit cells constituting the battery module. By providing a part of the case with a cut-away portion, a connector housing space is formed. The connector protrudes from a cut-away side-wall that defines a connector housing space and is located in the connector housing space.

6 Claims, 9 Drawing Sheets

(56) References Cited

FOREIGN PATENT DOCUMENTS

| WO | 2013/011836 | 1/2013 | | |
|----|----|----|----|----|
| WO | 2013/080385 | 6/2013 | | |
| WO | WO-2014034351 A1 * | 3/2014 | .......... | H01M 2/1061 |

* cited by examiner (a)

(b)

PRIOR ART

STORAGE CELL AND POWER STORAGE DEVICE IN WHICH SAME IS USED

CROSS-REFERENCE TO RELATED APPLICATIONS

This application is a U.S. national stage application of the PCT International Application No. PCT/JP2016/004096 filed on Sep. 8, 2016, which claims the benefit of foreign priority of Japanese patent application No. 2015-191581 filed on Sep. 29, 2015, the contents all of which are incorporated herein by reference.

TECHNICAL FIELD

The present disclosure relates to a storage cell and a power storage device.

BACKGROUND ART

Conventionally, for example, Patent Literature 1 describes a power storage device in which two each, four in total, of laminated batteries as unit batteries are attached to each of both surfaces of a substantially flat-plate battery housing body using a two-sided tape or the like so as to construct a battery module, and a plurality of such battery modules is housed in a housing in a state in which they are erected side by side along the longitudinal direction. In particular, referring to FIGS. 2 and 3 of Patent Literature 1, grip section (236) including grip through-hole (235) is provided protruding at one end portion of the battery housing body having a substantially rectangular shape in a plan view, and first and second connectors (232 and 234) are attached to both sides of the grip section.

CITATION LIST

Patent Literature

PTL 1: International Publication No. WO2013/011836

SUMMARY OF THE INVENTION

Technical Problem

When a connector for electrical connection is provided protruding at a back surface of a case of a storage cell, it is necessary to secure a space in consideration of protrusion of the connector and wiring of a cable extending from the connector. Therefore, when a power storage device is constructed by housing a plurality of such storage cells in a housing or mounting a plurality of storage cells in a rack, it is necessary to secure a space at a back surface side of the storage cell. Consequently, the dimension of the storage cell including the connector is increased, and an installation space for the power storage device is increased.

Solution to Problem

A storage cell of the present disclosure is a storage cell including a battery module including a plurality of unit cells, a case for housing the battery module, and a connector installed on a side-wall of the case and electrically connected to unit cells constituting the battery module. A cut-away portion is provided in a part of the case to form a connector housing space. The connector protrudes from a case cut-away side-wall that defines the connector housing space and is located in the connector housing space.

Advantageous Effect of Invention

According to a storage cell and a power storage device using the same in accordance with the present disclosure, a connector is installed in a connector housing space formed by a cut-away portion of a case. Therefore, the connector does not protrude from a back surface of the case of the storage cell. Thus, the dimension of the storage cell including the connector is reduced, so that a power storage device including a plurality of storage cells can be miniaturized. As a result, an installation space for a power storage device can be reduced in size.

BRIEF DESCRIPTION OF THE DRAWINGS

FIG. 8A is a view showing a storage cell housed in the rack as viewed from the above (including a partially enlarged view).

DESCRIPTION OF EMBODIMENTS

Hereinafter, an exemplary embodiment in accordance with the present invention is described in detail with reference to the attached drawings. In this description, specific shapes, materials, numerical values, directions, and the like, are just examples for easy understanding of the present invention, and can be appropriately changed depending on applications of use, purposes, specifications, and the like. Furthermore, in the following, a plurality of exemplary embodiments, modifications, and the like, are included, characteristics thereof are expected to be appropriately combined from the beginning.

Hereinafter, in FIG. 1 and other drawings, a direction of an arrow X showing one direction on a horizontal plane is referred to as a "width direction," a direction of an arrow Y showing a direction perpendicular to the arrow X is referred to as a "length direction," and a direction of an arrow Z showing a direction perpendicular to the arrows X and Y is referred to as a "vertical direction" or a "height direction". Furthermore, with reference to the length direction, one side is referred to as "front" and the other side is referred to as "back".

Figure 1:
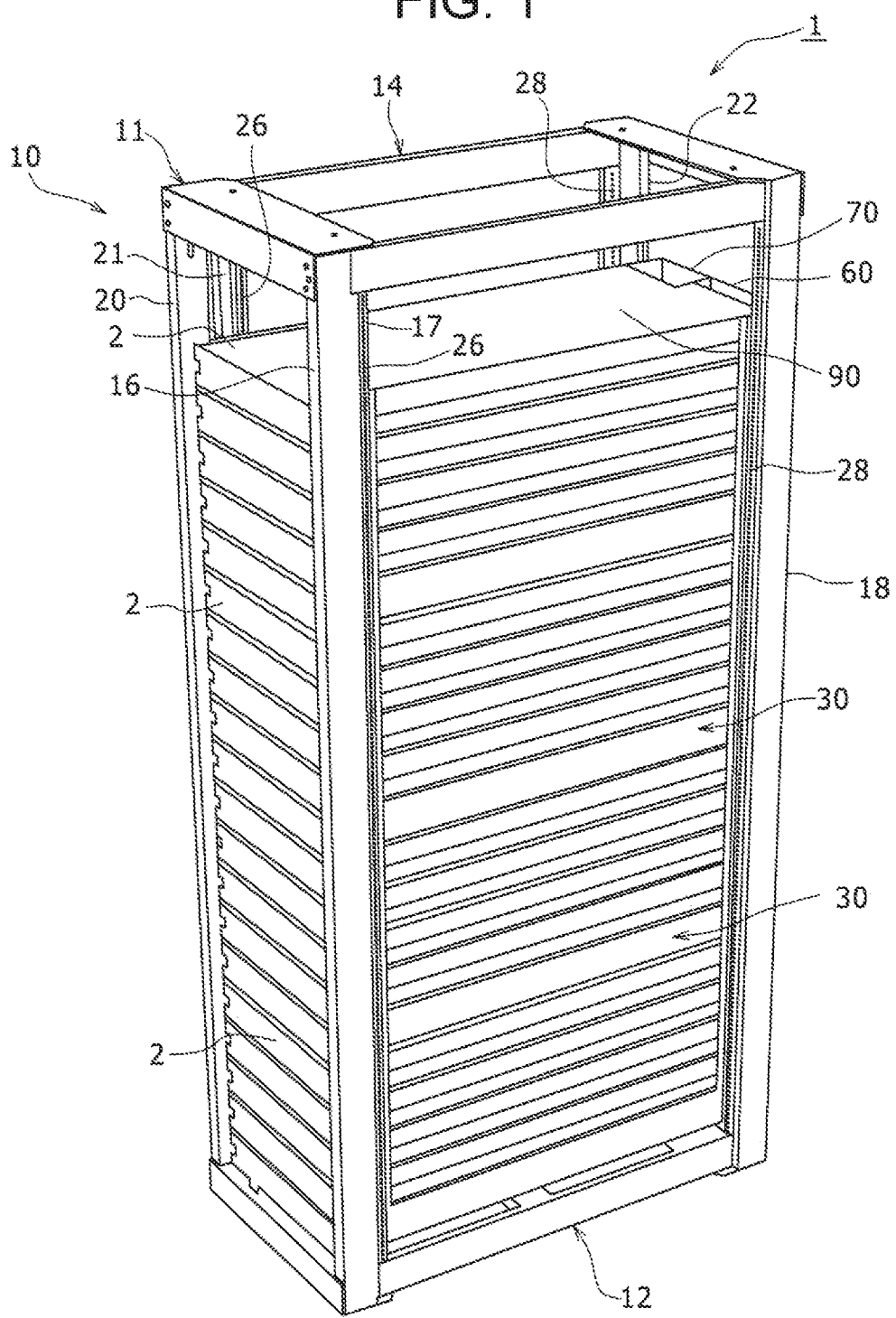
FIG. 1 is a perspective view showing a power storage device constructed by housing a plurality of storage cells in a rack viewed from the oblique front in accordance with one exemplary embodiment of the present invention.
Figure 2:
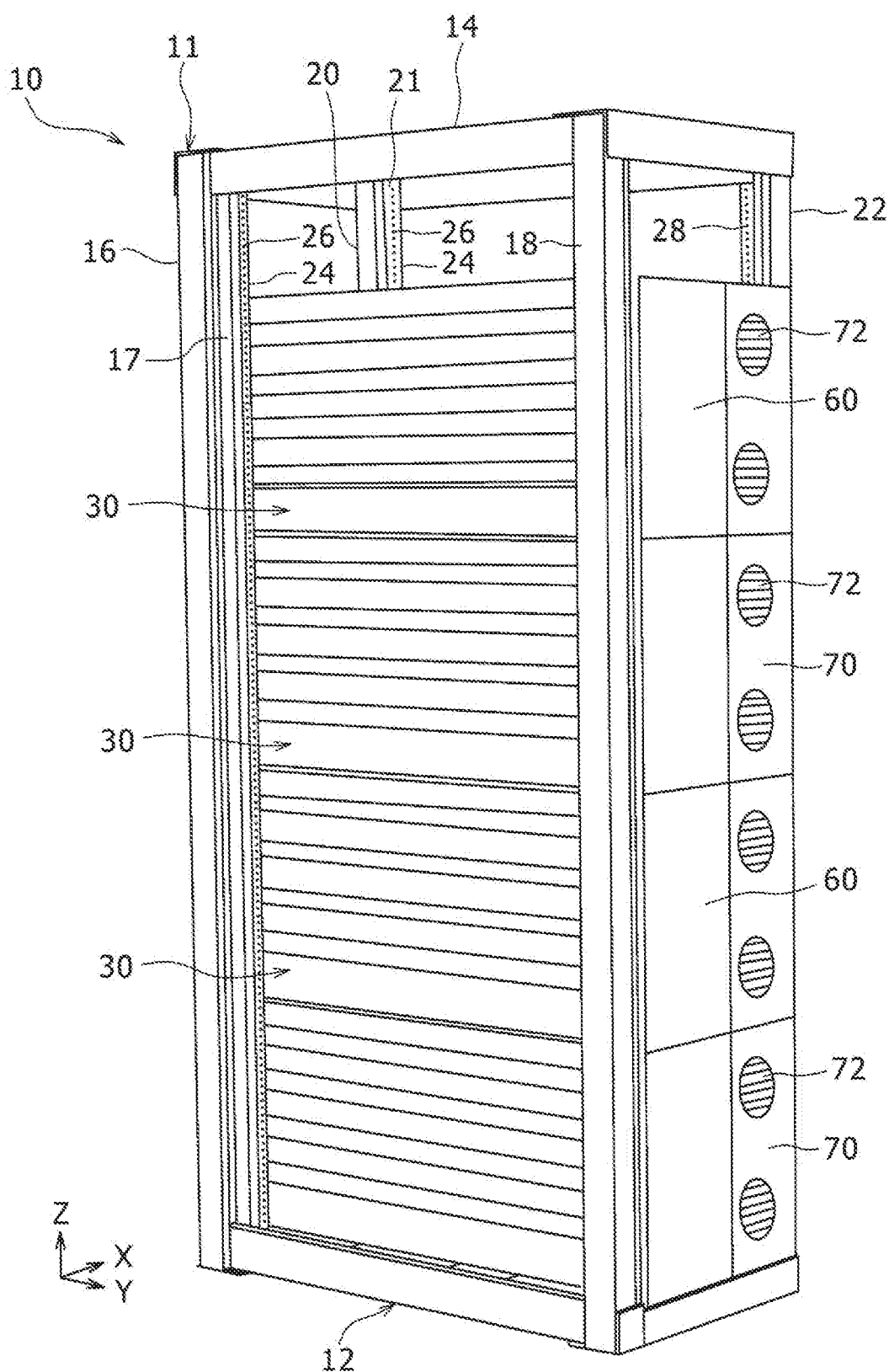
FIG. 2 is a perspective view showing the power storage device of FIG. 1 viewed from the obliquely back.
Figure 3:
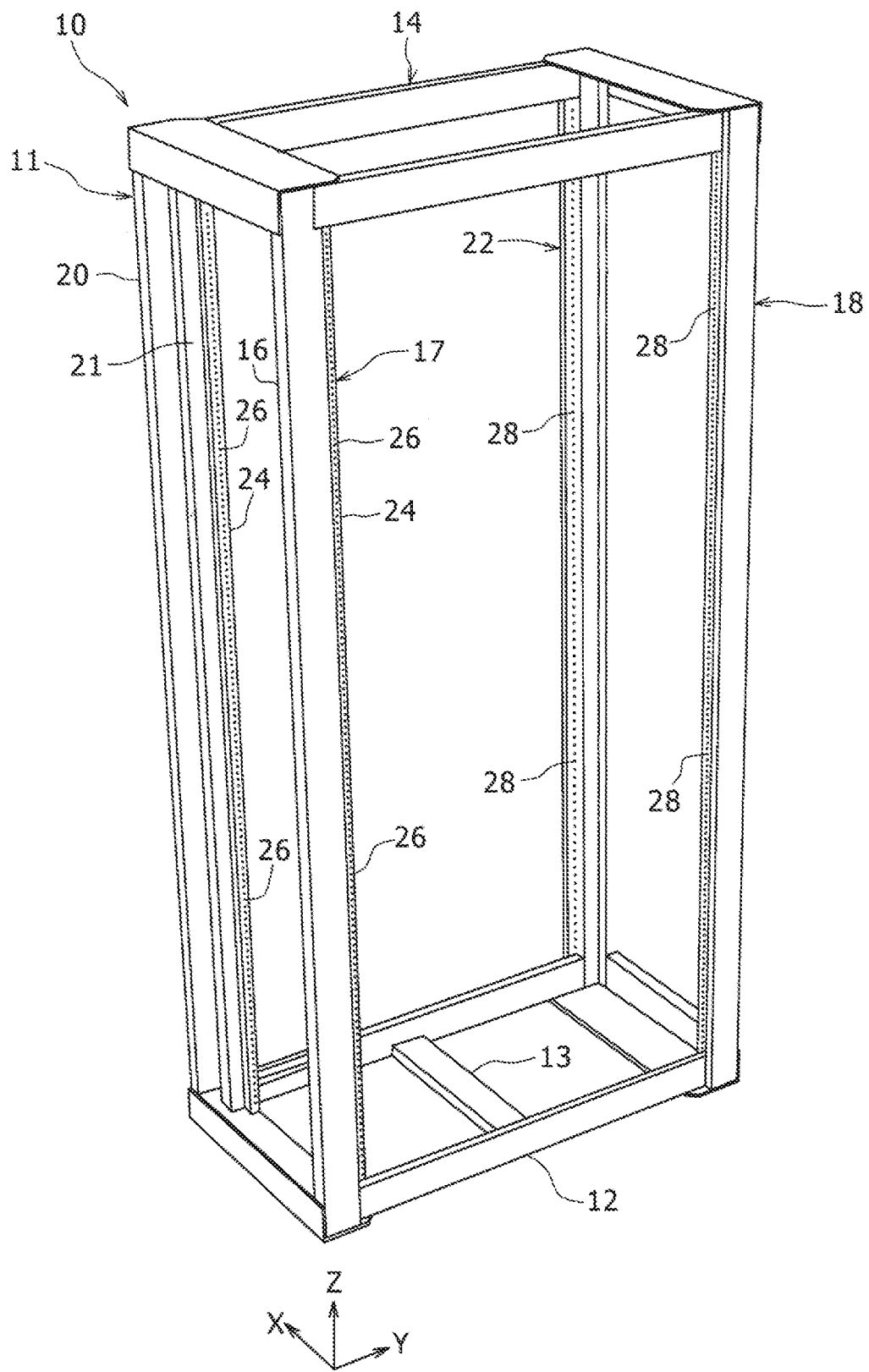
FIG. 3 is a perspective view as in FIG. 1, showing a rack in a state in which the storage cells are not housed.

FIG. 1 is a perspective view showing power storage device 1 constructed by housing a plurality of storage cells 2 in storage cell rack (hereinafter, appropriately abbreviated as "rack") 10 viewed from the oblique front in accordance with one exemplary embodiment of the present invention. FIG. 2 is a perspective view showing power storage device 1 viewed from the obliquely back. FIG. 3 is a perspective view showing rack 10 in a state in which the storage cells are not housed viewed as in FIG. 1.

As shown in FIG. 1, power storage device 1 includes rack 10 housing a plurality of storage cells 2 in stages in the vertical direction. Rack 10 is expected to house, for example, 20 of storage cells 2 arranged at a predetermined interval in the vertical direction. However, the number of storage cells 2 to be housed in one rack 10 is not necessarily limited to this, the number may be appropriately changed depending on an outer dimension and rated capacity of each storage cell 2, a dimension of a refrigerant passage necessary for securing the cooling performance with respect to each storage cell.

Hereinafter, firstly, rack 10 is described. Then, storage cell 2 is described.

As shown in FIGS. 1 to 3, rack 10 includes bottom frame portion 12, ceiling frame portion 14, as well as four support posts 16, 18, 20, and 22. As rack 10, conventionally existing standard racks, for example, a 19-inch rack, can be used. It is preferable that rack 10 has such strength as to be endurable when a large amount of heavy storage cells 2 are housed. A rack made of, for example, steel can be suitably used.

Both bottom frame portion 12 and ceiling frame portion 14 are formed in rectangular frame shapes, respectively. Bottom frame portion 12 may be formed by coupling four bottom frames using a fastening member such as a bolt, or four bottom frames may be formed unitarily with each other in advance. Furthermore, reinforcement frame 13 is disposed in the middle of bottom frame portion 12 along the width direction. Both ends of reinforcement frame 13 are coupled to bottom frame portion 12 by a fastening member such as a bolt.

In this exemplary embodiment, similar to bottom frame portion 12, ceiling frame portion 14 may be formed by coupling four bottom frames using a fastening member such as a screw and a bolt, or may be formed unitarily with each other in advance. Note here that, this exemplary embodiment shows an example in which ceiling frame portion 14 does not include a ceiling plate, but the configuration is not necessarily limited to this. In order to reduce deposition of dust, and the like, a ceiling plate for closing the upper surface of ceiling frame portion 14 may be provided as a separate member, or a ceiling plate may be unitarily formed. Furthermore, similar to bottom frame portion 12, also in ceiling frame portion 14, a reinforcement frame may be provided in the middle so as to enhance the strength of frame structure body 11.

Four support posts 16, 18, 20, and 22 are provided to stand corresponding to four corner portions of bottom frame portion 12 and ceiling frame portion 14. Each of support posts 16, 18, 20, and 22 is a long member extending along the vertical direction. For example, so-called L-shaped or rectangular U-shaped angles are used. Furthermore, the lower and upper ends of support posts 16, 18, 20, and 22 are fastened to bottom frame portion 12 and ceiling frame portion 14 by, for example, fastening members such as a screw and a bolt, respectively. Thus, bottom frame portion 12, ceiling frame portion 14, and four support posts 16, 18, 20, and 22 constitute frame structure body 11 including frame portions corresponding to 12 sides of the rectangular parallelepiped.

Two support posts 16 and 20, which are located in the front among the four support posts, have attachment portions 17 and 21, respectively. Attachment portions 17 and 21 are provided with a large number of attachment holes with a predetermined pitch along the vertical direction. Furthermore, two support posts 18 and 22, which are located in the back side among the four support posts, have attachment portions provided with a large number of attachment holes with a predetermined pitch. Hereinafter, two support posts 16 and 20 of rack 10 may be referred to as a front support post, and the other two support posts 18 and 22 may be referred to as a back support post.

As shown in FIG. 3, attachment portions 17 and 21 of front support posts 16 and 20 have narrow attachment plates 24, respectively. Each attachment plate 24 extends in the vertical direction and projects in the length direction. Attachment plate 24 is provided with a large number of attachment holes 26 with a predetermined pitch. In the side surfaces that face each other of back support posts 18 and 22 of rack 10, a large number of attachment holes 28 are formed with a predetermined pitch similar to the above.

Figure 4:
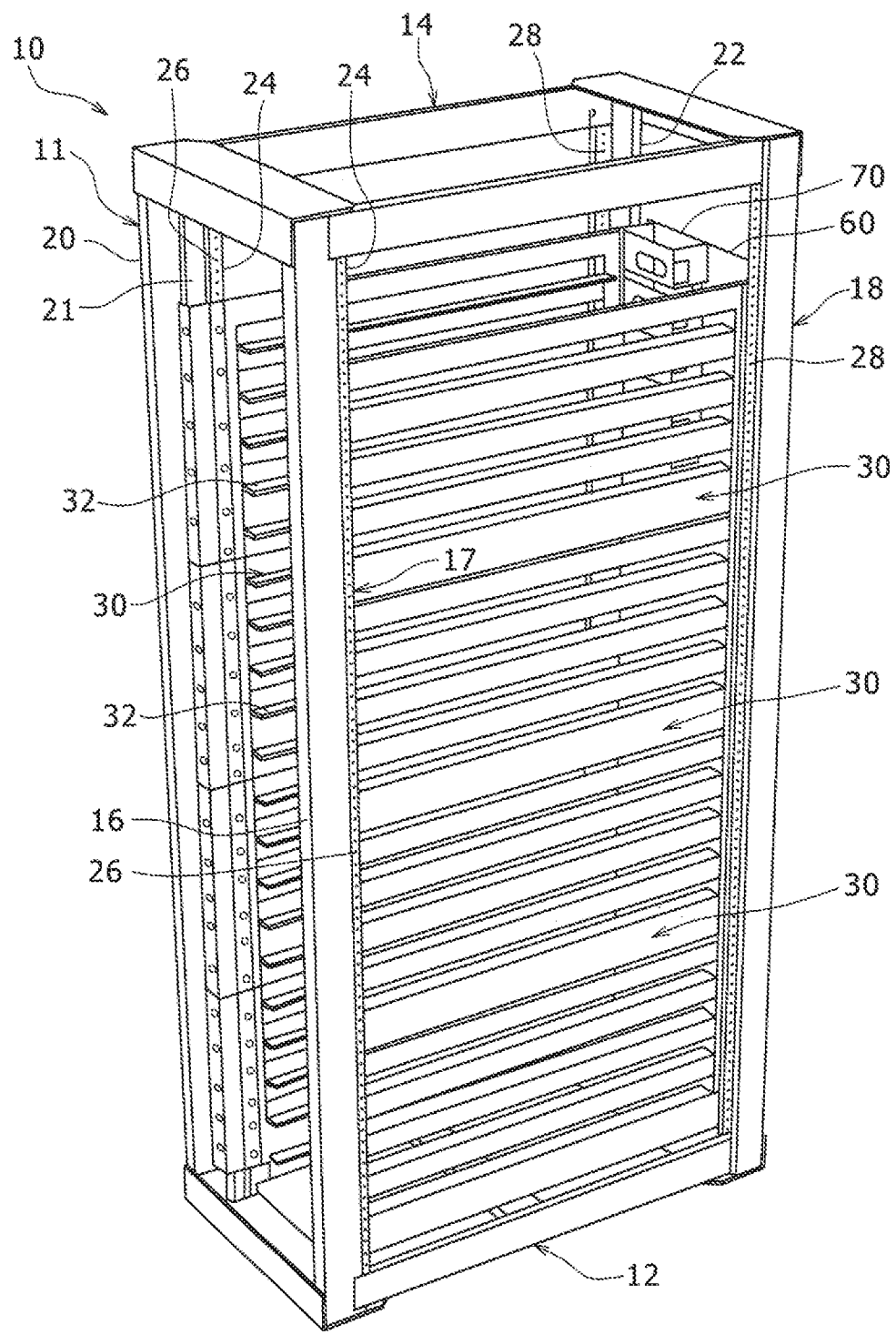
FIG. 4 is a perspective view showing a rack in which side panels, back panels, and fan panels are attached to a frame structure body.

FIG. 4 is a perspective view showing rack 10 in which a side panel, a back panel, and a fan panel are attached to frame structure body 11.

As shown in FIGS. 1, 2 and 4, rack 10 includes side panels 30. Side panel 30 is provided to a first pair of the support posts, that is, front support post 16 and back support post 18 on a first side surface in the width direction X. Side panel 30 is provided to a second pair of the support posts, that is, front support post 20 and back support post 22 on a second side surface in the width direction X. Thus, side panels 30 constitute side-wall surfaces facing the width direction X in rack 10. This exemplary embodiment shows an example in which four each of side panels 30 are attached to the both sides in the width direction of rack 10.

Furthermore, it is preferable that rack 10 include back panel 60 and fan panel 70. Back panel 60 may be attached to a back wall surface of side panel 30 between back support posts 18 and 22 as mentioned later. Alternatively, back panel 60 may be attached to back support posts 18 and 22.

Fan panel 70 is attached to back panel 60 and back support post 22 using a screw and the like on the back face of rack 10. As shown in FIG. 2, fan panel 70 is provided with attachment hole 72 having, for example, a circular shape. To this attachment hole 72, fan 74 (see FIG. 8A) is attached. Fan 74 has a function of allowing a cooling medium such as air to flow into a refrigerant passage formed between storage cells 2 when storage cells 2 are mounted and housed in rack 10 by side panel 30. A state in which air as the cooling medium flows in the refrigerant passage between storage cells 2 is mentioned later.

Figure 5:
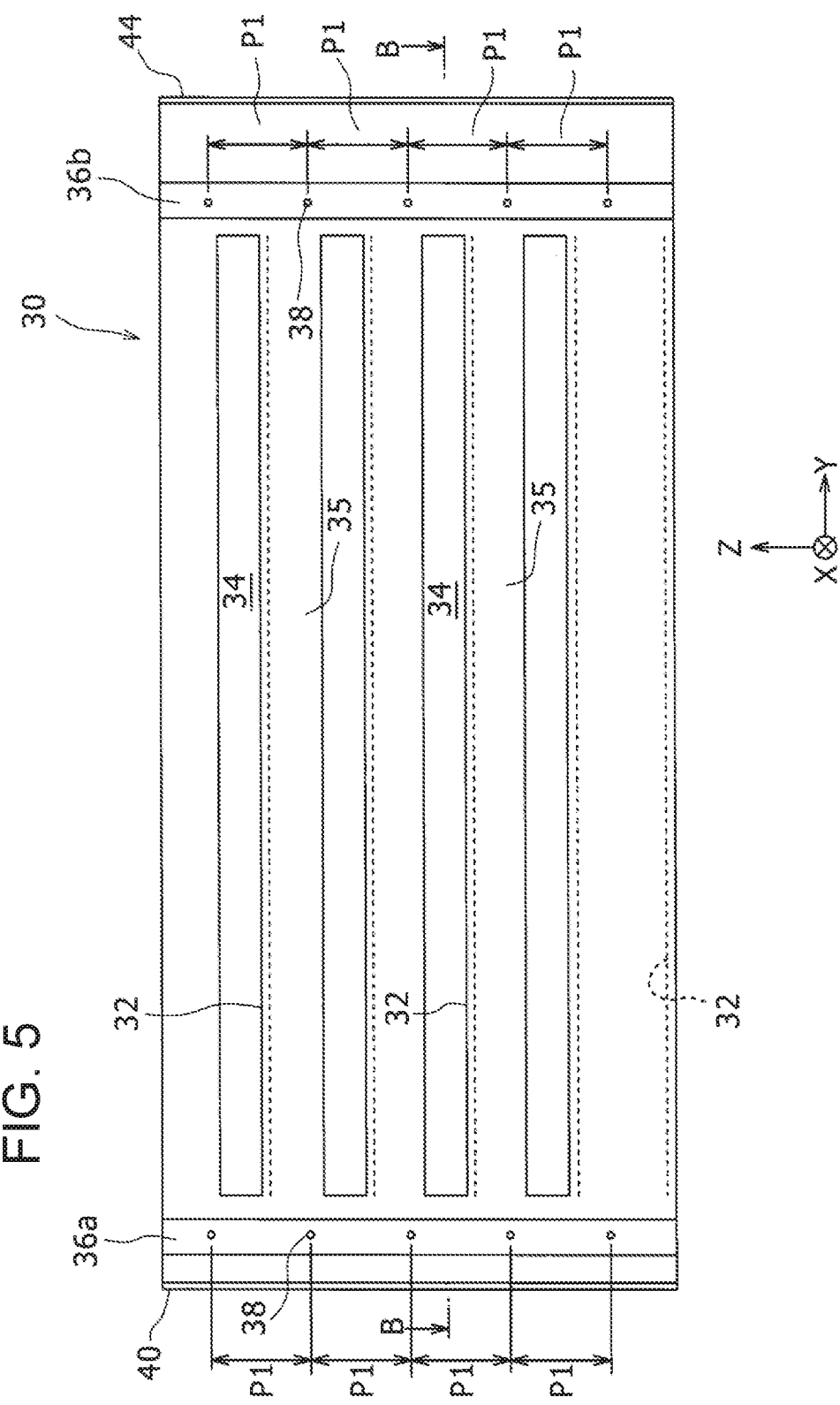
FIG. 5 is a front view of the side panel.
Figure 6:
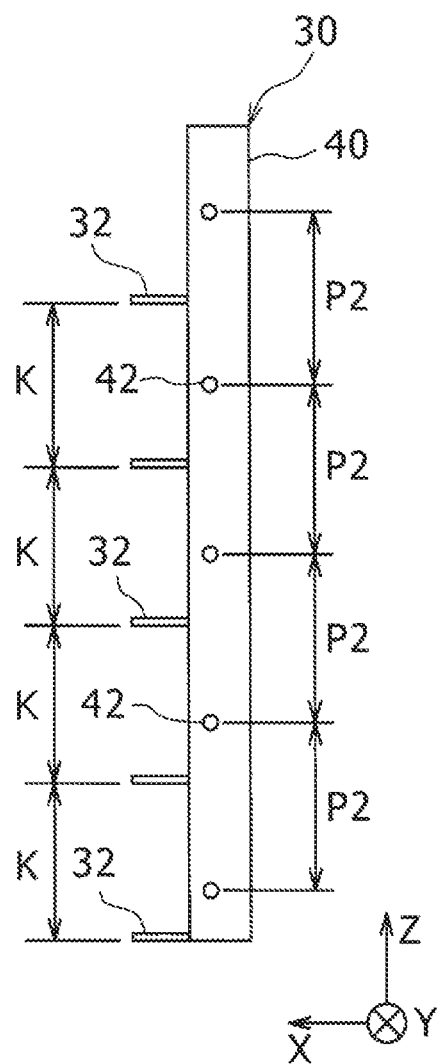
FIG. 6 is a side view of the side panel shown in FIG. 5 viewed from the front.
Figure 7:
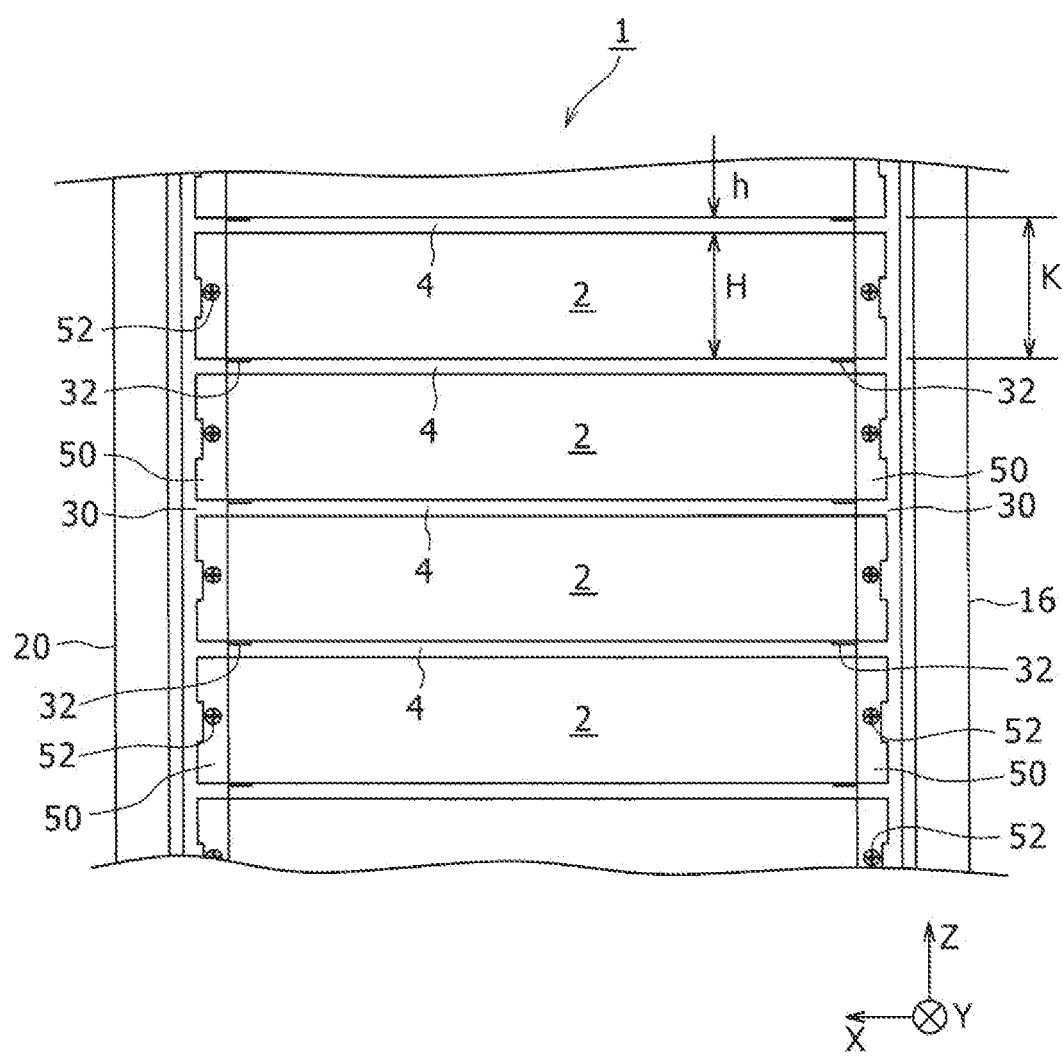
FIG. 7 is a partial front view of the power storage device viewed from the front.

FIG. 5 is a front view of side panel 30. FIG. 6 is a side view of side panel 30 viewed from the front. FIG. 7 is a partial front view of power storage device 1 viewed from the front. In rack 10, when being viewed from the front, side panel 30 attached to the right side and side panel 30 attached to the left side are mirror-symmetrical to each other. Accordingly, in the following, side panel 30 attached to the right side of rack 10 is described as an example.

As shown in FIGS. 5 and 6, each side panel 30 can be formed, for example, by bending one metal plate. Side panel 30 has a plurality of support portions 32. Support portions 32 protrude in the width direction perpendicular to the vertical direction, and are formed in parallel to each other. This exemplary embodiment shows an example in which five support portions 32 are formed on one side panel 30. That is to say, in the configuration of this exemplary embodiment, five storage cells 2 can be mounted by a pair of side panels 30 that are attached facing both sides in the width direction in rack 10.

Four support portions 32 among five support portions 32 are formed by bending a portion having a rectangular U-shaped slit of metal plate only at 90° inward. Furthermore, support portion 32 positioned in the lower-most part of side panel 30 is formed by bending lower end portion of the metal body inward in the width direction with a predetermined width.

As shown in FIG. 7, interval K between support portions 32 in the vertical direction is set to substantially equal to a total value of a height dimension H of storage cells 2 and a predetermined height dimension h of refrigerant passage 4 formed between a plurality of storage cells 2, which are mounted on support portions 32 and housed.

Furthermore, when support portion 32 excluding lowermost support portion 32 is formed by bending, each side panel 30 is provided with four opening portions 34. Each opening portion 34 has a thin elongated rectangular shape extending along the length direction as shown in FIG. 5. Formation of such opening portion 34 allows the side surface of storage cell 2 to be exposed to the outside of rack 10 via opening portion 34 when storage cell 2 is housed. This has advantages of improving heat dissipation from the side surface of storage cell 2. In this case, the entire side surface of storage cell 2 may not be exposed but at least a part may be exposed.

Furthermore, side panel 30 has closed portion 35 as shown in FIG. 5. Closed portion 35 is formed in a part suspending downward continuous to support portion 32. As shown in FIG. 7, refrigerant passage 4 is formed between storage cells 2 housed in rack 10 and supported by side panel 30. Closed part 35 of side panel 30 mentioned above has a function of closing opening portions at both sides in the width direction of the refrigerant passage between storage cells 2. Thus, the refrigerant passage between storage cells 2 housed in rack 10 can be formed as a passage that opens in the forward and backward directions, and the flowing direction of the air as a refrigerant can be defined. Note here that this exemplary embodiment shows an example in which closed portion 35 closes the entire opening portions at both sides in the width direction of refrigerant passage 4. However, the configuration is not necessarily limited to this, and a closed portion may close a part of the opening portions on both sides in the width direction of refrigerant passage 4 and open the other parts as an air passage portion.

As shown in FIG. 5, attachment portion 36a is formed at the front side in the width direction of side panel 30, and attachment portion 36b is formed at the back side in the width direction. Attachment portions 36a and 36b have, for example, five female screw holes 38 in the upward direction with a predetermined pitch P1. The predetermined pitch P1 is set corresponding to the pitch of attachment holes 26 formed in attachment portions 17 and 21 of front support posts 16 and 20. Thus, side panel 30 can be attached to front support posts 16 and 20 by screws inserted though attachment hole 26 of front support posts 16 and 20.

As shown in FIGS. 5 and 6, the front end portion of side panel 30 is bent substantially vertically to the outside of the width direction. The bent portion forms front side-wall 40 of side panel 30. This front side-wall 40 has, for example, five female screw holes 42 are formed in the vertical direction with a predetermined pitch P2. This predetermined pitch P2 can be set equal to a pitch with which storage cells 2 are housed in rack 10 in stages (for example, 20 stages). When height dimension H of storage cells 2 to be used in this exemplary embodiment is, for example, 90 mm, and a height dimension h of refrigerant passage 4 formed between storage cells 2 is, for example, 10 mm, arrangement pitch of storage cells 2 adjacent to each other in the vertical direction is 100 mm. Therefore, in this case, female screw holes 42 (portion to be fastened) formed on front side-wall 40 of side panel 30 may be set with a pitch P2 of 100 mm. Thus, as mentioned below, each storage cell 2 can be fixed to front side-wall 40 of side panel 30 via a fixed tab fixed to the front-end side-wall of storage cells 2.

Furthermore, as shown in FIG. 5, the back end portion of side panel 30 is bent in the same manner as in front side-wall 40 as mentioned above so as to form back side-wall 44. Similar to front side-wall 40, this back side-wall 44 may also have, for example, five female screw holes (not shown) arranged in the vertical direction with a predetermined pitch P2. By inserting the screws through the female screw holes formed in this back side-wall 44 and fastening thereof, back panel 60 and fan panel 70 can be fixed.

Four side panels 30 each formed as mentioned above are attached to both ends in the width direction of rack 10. Back panel 60 and fan panel 70 are attached to back side-wall 44 of side panel 30 using a screw and the like. Thus, rack 10 as shown in FIG. 4 is assembled. In this case, since each side panel 30 has support portions 32 for five storage cells, assembly becomes specifically easier as compared with the case where one each of rack (shelf) corresponding to each housing device is assembled to frame structure body 11 using a fastening member such as a screw and a bolt.

Then, storage cells 2 are inserted into rack 10 assembled as mentioned above from the front, so that the lower-side corner portions of each storage cell 2 are mounted on support portions 32 of side panel 30 at both end sides in the width direction. As shown in FIG. 7, fixed tabs 50 are respectively attached to both sides in the width direction of the front end portion in the housing of storage cells 2 by, for example, welding, screwing, or the like. Screw 52 is inserted into the through-hole formed in each fixed tab 50, and clamped to female screw hole 42 formed in front side-wall 40 of side panel 30. Thus, storage cells 2 are housed in rack 10 in a state in which refrigerant passage 4 having a predetermined height dimension h is formed between storage cells 2. Thus, power storage device 1 is assembled.

Figure 8:
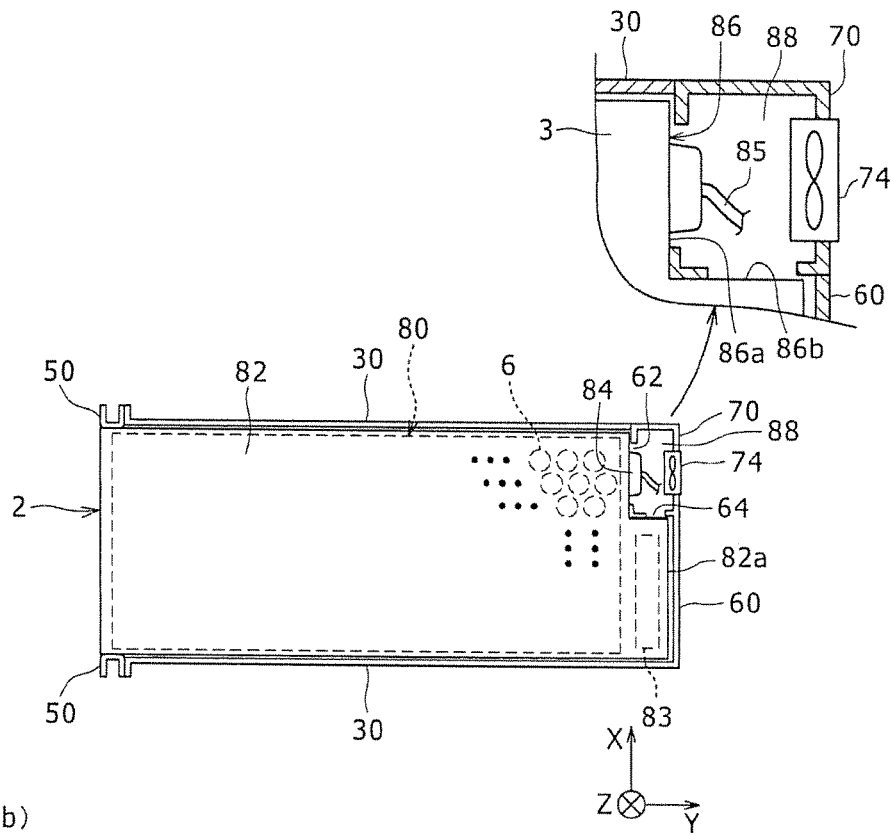
FIG. 8 is a view showing a conventional storage cell as viewed from the above.
Figure 8:
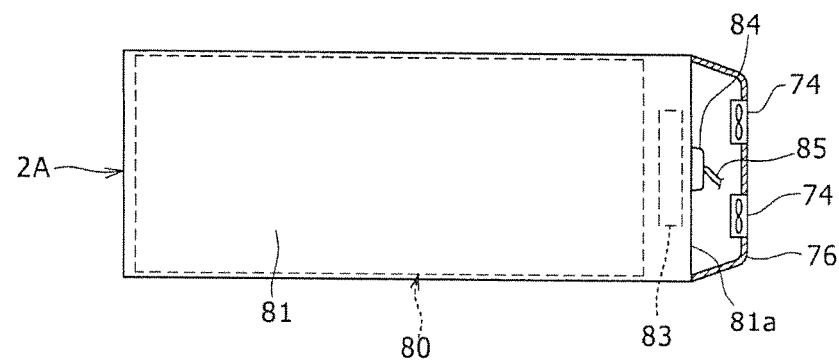

Next, referring to FIG. 8, storage cell 2 of this exemplary embodiment is described. FIG. 8A is a view showing storage cell 2 housed in rack 10 viewed from the above (including a partially enlarged view); FIG. 8B is a view showing conventional storage cell 2A viewed from the above.

As shown in FIG. 8A, storage cell 2 includes battery module 80, case 82 for housing battery module 80, and connector 84 installed on a side-wall of the case.

Battery module 80 includes a large number of cylindrical unit cells 6. These unit cells 6 are aligned by a holder (not shown). Furthermore, unit cells 6 are connected in series, or in parallel, or in combination of series and parallel. As unit cell 6, for example, a lithium-ion secondary cell is suitably used. Note here that each unit cell 6 is not necessarily limited to a cylindrical secondary cell, and may be a rectangular secondary battery.

Case 82 is a flat, substantially rectangular parallelepiped-shaped container. Case 82 can be formed of a housing having a bottom and opening upward, and a lid for closing the upper opening. Furthermore, case 82 is preferably, for example, a container made of resin for securing insulation between storage cells 2.

Cut-away portion 86 is formed in a part of case 82. Specifically, cut-away portion 86 is formed at a first corner portion at the back side in the length direction Y of case 82. Case 82 has a substantially rectangular shape in a plan view. Cut-away portion 86 is cut away to be formed in substantially a rectangular shape in a plan view. Two cut-away side-walls 86a and 86b of the thus formed cut-away portion 86 define connector housing space 88 formed of a rectangular parallelepiped space.

Connector 84 is electrically coupled to each unit cell 6 included in battery module 80 housed inside case 82 via a positive electrode current collector plate, a negative electrode current collector plate and a busbar (all are not shown in the drawing). Connector 84 is installed on cut-away side-wall 86a facing backward in the length direction Y among two cut-away side-walls 86a and 86b constituting cut-away portion 86 of case 82. Connector 84 protrudes from cut-away side-wall 86a, but is located inside connector housing space 88. Thus, connector housing space 88 has a function of preventing connector 84 from projecting from the back surface of storage cell 2, that is, back side surface 82a of case 82.

Cable 85 extends from connector 84. Input and output of electric power (that is, charge and discharge) can be carried out with respect to battery module 80 constituting storage cell 2 through connector 84 and cable 85. In this case, connector housing space 88 can also function as a wiring space for cable 85 extending from connector 84. Therefore, it is not necessary to secure a space or a passage for wiring a cable. This configuration contributes to miniaturization of power storage device 1.

Figure 9:
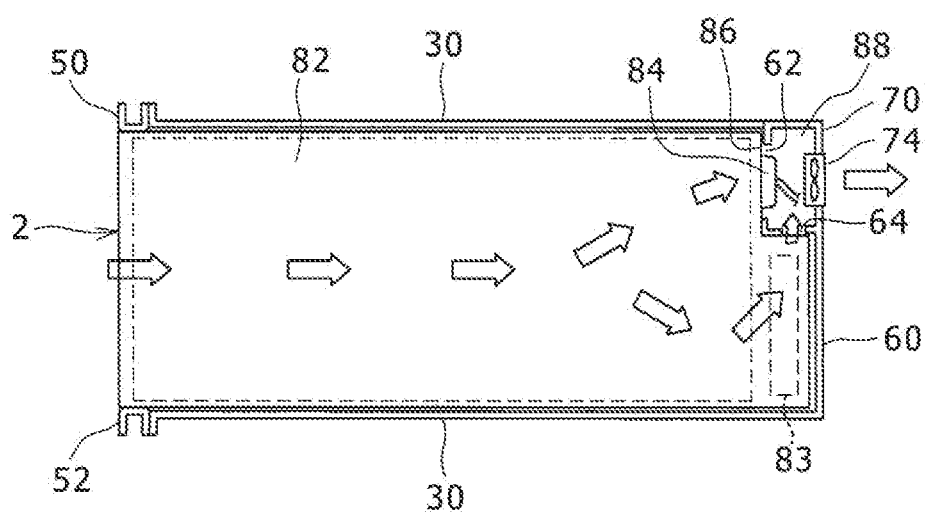
FIG. 9 is a view schematically showing a flow of air in a refrigerant passage.

FIG. 9 is a view schematically showing a flow of air in refrigerant passage 4. As shown in FIG. 8A and FIG. 9, fan 74 attached to fan panel 70 is disposed facing connector housing space 88. When fan 74 is driven, as shown in FIG. 9, air as an example of the refrigerant is sucked and flows from an opening portion of the front surface of power storage device 1. Accordingly, the air entering from the front of rack 10 into refrigerant passage 4 flows to the back inside refrigerant passage 4. During this time, the air cools storage cells 2 located in the upper and lower sides. Thereafter, the air is exhausted to the outside of power storage device 1 from fan 74 via through-holes 62 and 64 formed in back panel 60 and through connector housing space 88. In this way, connector housing space 88 defined by cut-away portion 86 of storage cell 2 also functions as a refrigerant passage. As mentioned above, both sides of refrigerant passage 4 in the width direction are closed by closed part 35 of side panel 30 in at least a part thereof. Therefore, it is advantageous that an effective refrigerant passage is formed by reducing the air flowing in and out from the both sides of refrigerant passage 4 in the width direction.

Referring to FIG. 8A again, electric control substrate 83 is housed in case 82 of storage cell 2. Control substrate 83 has a function of controlling of input-output power of battery module 80 or monitoring the battery state, and the like. Control substrate 83 is disposed at the back-side end portion in the length direction Y of case 82 at a second corner side at which cut-away portion 86 is not formed. In this way, when control substrate 83 is disposed avoiding cut-away portion 86, so that a space in case 82 is utilized, which contributes to miniaturization of storage cell 2.

In conventional storage cell 2A shown in FIG. 8B, connector 84 is installed and protrudes at back surface 81a of case 81 of storage cell 2A, and cable 85 extends from connector 84. Furthermore, cover 76 is provided to the back end portion of storage cell 2A, and fan 74 is attached to cover 76. In this case, in order to improve sucking of air by fan 74, it is necessary to secure a space to some extent between fan 74 and back surface 81a of storage cell 2A. Therefore, in such a storage cell 2A, the dimension in the length direction is increased. Accordingly, a power storage device constructed by mounting and housing storage cell 2A in a rack is also increased in size, so that an installation space thereof is also increased in size.

On the contrary, as mentioned above, according to storage cell 2 and power storage device 1 using the same of this exemplary embodiment, cut-away portion 86 formed in case 82 of storage cell 2 defines connector housing space 88, and connector 84 is housed therein. Consequently, connector 84 does not project from back surface 82a of case 82 of storage cell 2. Thus, the length dimension of storage cell 2 including connector 84 is reduced, so that power storage device 1 including a plurality of storage cells 2 can be miniaturized. As a result, installation space for power storage device 1 can be reduced in size.

Furthermore, in this exemplary embodiment, connector housing space 88 of storage cell 2 can be used as a wiring space for cable 85 that extends from connector 84, and also as a refrigerant passage. This configuration can also contribute to miniaturization of storage cell 2 and power storage device 1 using storage cells 2. As a result, an installation space for power storage device 1 can be reduced in size.

Note here that the present invention is not limited to the above-mentioned exemplary embodiment and the modification thereof, modifications and variations can be carried out in the matter described in the claims of the present application and an equivalent scope thereof.

For example, in the above-mentioned example, cut-away portion 86 is provided in one corner of substantially rectangular parallelepiped-shaped case 82 in storage cell 2 so as to form connector housing space 88. The configuration is not necessarily limited to this alone. The cut-away portion that defines the connector housing space may be formed in a recess shape in a middle position in the width direction of the back end of the case.

REFERENCE MARKS IN THE DRAWINGS 1 power storage device
2, 2A storage cell
4 refrigerant passage
6 unit cell
10 storage cell rack
11 frame structure body
12 bottom frame portion
13 reinforcement frame
14 ceiling frame portion
16, 18, 20, 22 support post
17, 21, 36a, 36b attachment portion
24 attachment plate
26, 28, 72 attachment hole
30 side panel
32 support portion
34 opening portion
35 closed portion
38, 42 female screw hole
40 front side-wall
44 back side-wall
50 fixed tab
60 back panel
62, 64 through-hole
70 fan panel
74 fan
76 cover
80 battery module 81, 82 case
81a, 82a back surface or back-side surface
83 control substrate
84 connector
85 cable
86 cut-away portion
86a, 86b cut-away side-wall
88 connector housing space
H, h: dimension
K: interval
P1, P2: predetermined pitch
W: protruding width
Y: length direction
Z: vertical direction

The invention claimed is:

1. A storage cell comprising:
a battery module including a plurality of unit cells;
a case for housing the battery module; and
a connector installed on a side-wall of the case and electrically connected to the unit cells constituting the battery module,
wherein a cut-away portion is provided in a part of the case to form a connector housing space, the connector protrudes from a case cut-away side-wall that defines the connector housing space and is located in the connector housing space,
the cut-away portion extends along an entire side-wall of the case in a thickness direction of the case, and the side-wall of the case extends along an entire side-wall of the battery module in the thickness direction, and
the connector housing space functions as a refrigerant passage that allows a refrigerant for cooling the storage cell to flow.

2. The storage cell according to claim 1, wherein the connector housing space functions as a space for wiring a cable extending from the connector.

3. The storage cell according to claim 1, wherein the case has a substantially rectangular parallelepiped shape, and the cut-away portion is formed at a first corner portion of one end portion of the case.

4. The storage cell according to claim 3, wherein a control substrate for controlling the battery module is housed in the case, and the control substrate is disposed at a second corner portion side that is not provided with the cut-away portion.

5. A power storage device comprising:
a plurality of the storage cells, each of the storage cells comprising:
a battery module including a plurality of unit cells;
a case for housing the battery module; and
a connector installed on a side-wall of the case and electrically connected to the unit cells constituting the battery module, and
a rack for mounting and housing the plurality of the storage cells with spaces as refrigerant passages formed between adjacent ones of the plurality of the storage cells,
wherein a cut-away portion is provided in a part of the case to form a connector housing space, the connector protrudes from a case cut-away side-wall that defines the connector housing space and is located in the connector housing space, and
the cut-away portion extends along an entire side-wall of the case in a thickness direction of the case, and the side-wall of the case extends along an entire side-wall of the battery module in the thickness direction.

6. The power storage device according to claim 5, wherein the rack has a fan facing the connector housing space that is provided in the case of the storage cell.

* * * * *